D. C. LUCE.
STEERING MECHANISM FOR MOTOR VEHICLES.
APPLICATION FILED NOV. 9, 1910.
1,016,838.
Patented Feb. 6, 1912.
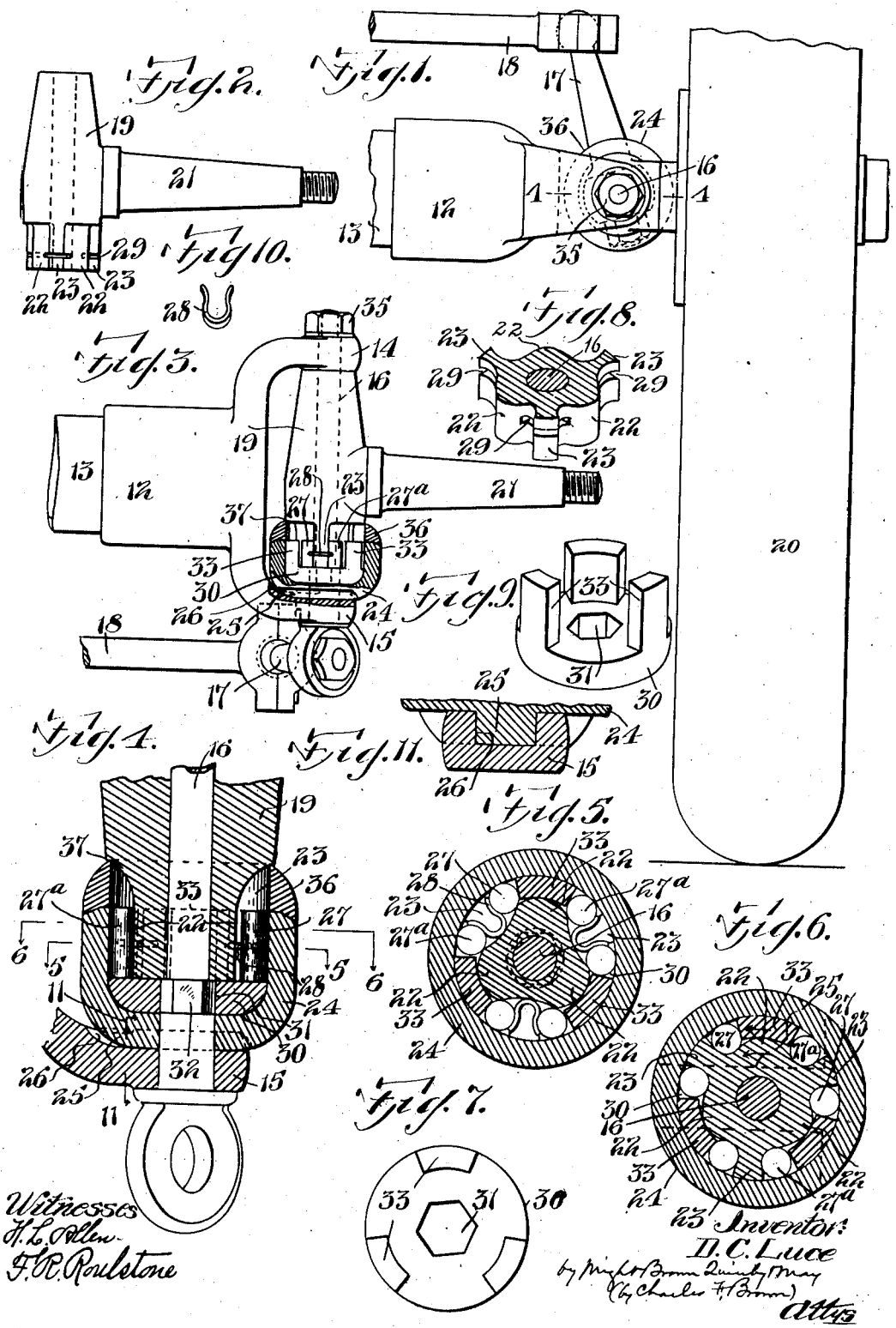

UNITED STATES PATENT OFFICE.

DON CURTIS LUCE, OF BOSTON, MASSACHUSETTS.

STEERING MECHANISM FOR MOTOR-VEHICLES.

1,016,838.  Specification of Letters Patent.  Patented Feb. 6, 1912.

Application filed November 9, 1910. Serial No. 591,510.

*To all whom it may concern:*

Be it known that I, DON CURTIS LUCE, of Boston, in the county of Suffolk and State of Massachusetts, have invented certain new and useful Improvements in Steering Mechanism for Motor-Vehicles, &c., of which the following is a specification.

This invention relates to mechanism for imparting motion from a manually operated controller such as a steering lever or hand wheel held by the operator to a steering wheel or wheels forming a part or parts of the running gear of a motor vehicle such as a motor bicycle having one steering wheel, or an automobile having two steering wheels, the mechanism having provisions for automatically locking the steering wheel or wheels against displacement by obstacles on the track on which the vehicle is running. It is well known that a sudden resistance to the forward movement of a steering wheel, is liable to suddenly check its forward movement, so that motion is transmitted from the steering wheel back to the controller tending to cause a temporary loss of control of the latter by the operator.

My invention has for its object to provide a simple, durable and effective mechanical contrivance for automatically locking a steering wheel against relative backward movement when it encounters an obstacle on the track, without interference with the usual functions of the mechanism which imparts steering movements from the controller to the steering wheel or wheels.

The invention consists in the improvements which I will now proceed to describe and claim.

Of the accompanying drawings which form a part of this specification,—Figure 1 represents a top plan view of a part of the steering axle of an automobile, a part of one of the steering wheels thereof, and mechanism embodying my invention for transmitting steering movements from a controller (not shown) to the steering wheel; Fig. 2 represents a front elevation of the axle arm on which the steering wheel shown by Fig. 1 is mounted, and the hub which carries said axle arm; Fig. 3 represents in front elevation the said axle arm and hub, a portion of the steering axle, and parts of the motion-transmitting mechanism, other parts of said mechanism being shown in section; Fig. 4 represents a section on line 4—4 of Fig. 1, parts shown by the last named figure being omitted; Fig. 5 represents a section on line 5—5 of Fig. 4; Fig. 6 represents a section on line 6—6 of Fig. 4; Fig. 7 represents a top plan view of the unlocking cup hereinafter referred to; Fig. 8 represents a perspective sectional view of the cam portion of the axle arm hub; Fig. 9 represents a perspective view of the unlocking cup; Fig. 10 represents a perspective view of one of the roll-pressing springs hereinafter referred to; and Fig. 11 represents a section on line 11—11 of Fig. 4.

Similar reference characters indicate the same or similar parts in all the figures.

In the drawings, 12 represents a carrying member here shown as a collar affixed to the steering axle 13 of an automobile, said member being provided with bearings, here shown as formed in ears or brackets 14, 15, in which a spindle 16 is adapted to be turned or partially rotated by a hand manipulated controller (not shown) such as a lever or a hand wheel, connected with the spindle through suitable intermediate means which, as here shown, include a lever 17 attached to the spindle and a rod 18 suitably connected with the lever and with the controller.

19 represents a hub or collar which is mounted to turn or partially rotate on the spindle 16, said hub being suitably connected with a steering wheel 20. When my invention is adapted to an automobile the hub 19 is provided with an axle arm 21 on which the steering wheel 20 rotates. The hub 19 is provided at its lower end portion with a series of bisymmetrical or double cams 22 (Fig. 8,) and between these cams with a series of radial arms 23.

24 represents a locking cup which is supported by the arm or bracket 15 and is detachably engaged therewith so that it cannot rotate, by means of a tongue 25 on the bottom of the cup, and a groove 26 in the arm 15, said groove receiving the tongue and permitting the removal of the cup from the arm. The bottom of the cup has an orifice through which the spindle 16 passes and in which it is free to rotate. The cup 24 has a cylindrical inner surface which surrounds and is concentric with the spindle and is separated from the cams 22, the surfaces of said cams and the inner surface of the cup 24 forming the sides of segmental roll-receiving chambers, the ends of which are formed by the arms 23, each chamber having wider end portions which taper or decrease in width gradually toward the central portion, as shown by Fig. 6, the taper being due to the fact that the cams 22 are not concentric with the inner surface of the cup. In each of said chambers are two rolls 27 and 27ᵃ formed to have a fairly close fit in the wider portions of the chambers, and to bear simultaneously against the outer and inner surfaces thereof, the arrangement being such that when either roll is moved toward the narrower central portion of the chamber containing it, the roll binds on the sides of the chamber and locks the hub 19 to the cup. The rolls are normally pressed toward the narrower portions of the chambers by U shaped springs 28 (Figs. 5 and 10) located in slots 29 (Fig. 8) in the arms 23, each spring being between a roll 27 and a roll 27ᵃ and acting to press said rolls in opposite directions. The springs, which may be conveniently made of wire, are confined against sidewise displacement by the sides of the slots 29.

30 represents a collar having a hexagonal orifice 31 (Fig. 9) which receives a hexagonal portion 32 (Fig. 4) on the spindle 16, the collar being thus engaged with the spindle and caused to turn therewith. The collar which is located in the cup 24 and adapted to turn therein, has a series of upwardly projecting fingers 33 which occupy the central portions of the roll-receiving chambers, each finger being interposed between a roll 27 and a roll 27ᵃ in said chamber. I term the collar 30 and its fingers an unlocking cup. There is a slight lost motion between the fingers and the rolls so that when the unlocking cup is turned in one direction its fingers will force the rolls of one series against the arms 23 and thus unlock said rolls or remove them from their locking engagement with the locking cup and cams, and transmit motion through said rolls to the arms and the hub 19, the rolls of the other series being at the same time slightly loose so that they follow the fingers without resisting rotation of the hub. The rolls against which the fingers press therefore act as struts to transmit motion from the spindle and unlocking cup to the hub.

It will now be seen that when the spindle is turned in either direction the fingers 33 of the unlocking cup act through one series of rolls to turn the hub 19 in the same direction and thus impart a steering movement to the wheel connected with the hub. If the steering wheel encounters an obstacle in the track tending to displace it from the desired position and incidentally rotate the hub independently of the spindle, the rolls of one series immediately engage the sides of the chambers in which they are located and lock the hub to the locking cup 24. If the displacing force is exerted on the hub in the direction indicated by the arrow marked thereon in Fig. 6, the rolls 27 act to lock the hub. If the displacing force is in the opposite direction the rolls 27ᵃ become the locking rolls. The springs 28 act promptly to force the rolls to their locking position whenever occasion requires.

The described mechanism is so compact that it is adapted to be applied to practically all makes of automobiles, motor cycles and other motor driven vehicles. When adapted, as here shown, to a steering axle of an automobile, it is readily accommodated in the space usually provided for the hub of the axle arm. The detachable connection between the locking cup and its support enables the parts of the mechanism embodying my invention to be readily assembled and separated, the parts being separable upon the removal of the nut 35 which confines the spindle 16 in place. When the parts are being assembled, a dust-excluding ring 36 is placed on the end of the cup, and is confined thereon by a shoulder 37 on the hub 19.

The collar 30 forming the bottom of the unlocking cup, has an extended bearing on the bottom of the fixed locking cup, so that the wear due to the turning movements of the unlocking cup and the weight supported thereby, is reduced to the minimum.

The described steering mechanism may be utilized in a sailing vessel as a means for imparting motion from a tiller or like controller to a rudder, the hub 19 being suitably attached to or connected with the rudder.

I claim—

1. A steering mechanism comprising a hub having a series of bisymmetrical cams and radial arms between said cams, said arms having transverse slots, U-shaped springs engaged with said slots and confined thereby against sidewise displacement, a locking cup surrounding the hub, the cup and the hub cams forming roll-receiving chambers, each of which is wider at its ends than at its center, rolls in the end portions of said chambers in contact with the springs, and pressed simultaneously thereby in opposite directions toward the central portion of the chambers, an unlocking cup having fingers located in the central portions of the chambers, between the rolls therein, and a spindle engaged with the unlocking cup, and adapted to turn in the hub.

2. A steering mechanism comprising a supporting member having ears or brackets, a spindle journaled in said brackets, a hub mounted on the spindle and provided with a series of cams and arms at its lower portion, a non-rotating locking cup detachably engaged with one of said brackets, and surrounding the hub-cams and arms, the surfaces of the cams, arms and cup-forming roll-receiving chambers, each of which is wider at its ends than at its center, rolls located in said chambers, means for pressing said rolls toward the central portion of the chambers, an unlocking cup engaged with the spindle to turn therewith and provided with fingers which coöperate with the rolls, a dust-excluding ring confined between the margin of the locking cup and a shoulder on the hub, and means, such as a nut, engaged with the spindle for detachably connecting said parts.

In testimony whereof I have affixed my signature, in presence of two witnesses.

DON CURTIS LUCE.

Witnesses:
C. F. BROWN,
P. W. PEZZETTI.